United States Patent
Rahman et al.

(10) Patent No.: US 11,254,516 B1
(45) Date of Patent: Feb. 22, 2022

(54) AUTOMATIC TOTE AND CARTON DIVERTER AND CHUTE SYSTEM

(71) Applicant: Amazon Technologies, Inc., Seattle, WA (US)

(72) Inventors: Sayeedur Rahman, Issaquah, WA (US); Sivan Almosnino, Snoqualmie, WA (US); Dan Lorne Robin, Seattle, WA (US); Lisa Garamella, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 273 days.

(21) Appl. No.: 16/689,835

(22) Filed: Nov. 20, 2019

(51) Int. Cl.
*B65G 47/74* (2006.01)
*B65G 11/02* (2006.01)

(52) U.S. Cl.
CPC ............ *B65G 47/74* (2013.01); *B65G 11/023* (2013.01); *B65G 2203/042* (2013.01)

(58) Field of Classification Search
CPC . B65G 47/74; B65G 11/023; B65G 2203/042
See application file for complete search history.

(56) References Cited

U.S. PATENT DOCUMENTS

| | | | | |
|---|---|---|---|---|
| 2,886,164 A * | 5/1959 | Solecki | ................. | B65H 67/06 198/358 |
| 3,231,068 A * | 1/1966 | Harrison | .............. | B65G 17/345 198/370.06 |
| 3,276,563 A * | 10/1966 | Fitzgerald | ............ | B65G 47/766 198/367 |
| 3,581,865 A * | 6/1971 | Adams | ................. | B65G 17/007 198/525 |
| 5,395,206 A * | 3/1995 | Cerny, Jr. | ............ | B65G 1/1378 414/270 |
| 5,971,132 A * | 10/1999 | Bonnet | .................. | B65G 47/54 198/370.07 |
| 10,150,626 B2 * | 12/2018 | Eisenberg | .............. | B65G 47/46 |
| 10,167,145 B2 * | 1/2019 | Spaulding | ............ | B65G 1/1378 |
| 10,913,607 B2 * | 2/2021 | Hognaland | .......... | B65G 1/0485 |
| 10,984,375 B2 * | 4/2021 | Lert, Jr | ................ | G05D 1/0088 |
| 2004/0139692 A1 * | 7/2004 | Jacobsen | ................. | B65B 57/12 53/55 |

* cited by examiner

*Primary Examiner* — William R Harp
(74) *Attorney, Agent, or Firm* — Kilpatrick Townsend & Stockton LLP

(57) ABSTRACT

An inventory container diverter system is described. The system includes a conveyor to move totes through a shipment processing area and a redirection device to push totes perpendicularly off the conveyor at predetermined locations. Adjacent the redirection device is a chute which the tote slides down to present the tote to a user at an easily accessible height and tilted at such an angle to enable simple and efficient access to the interior of the tote. The chute includes a door to help prevent totes from falling out of the chute. A tote sensor detects when the chute is occupied by a tote or when it is clear and a door sensor detects when the door of the chute is closed. When the door is closed and the chute is clear the system directs a new tote to the redirection device and pushes it into the chute.

20 Claims, 10 Drawing Sheets

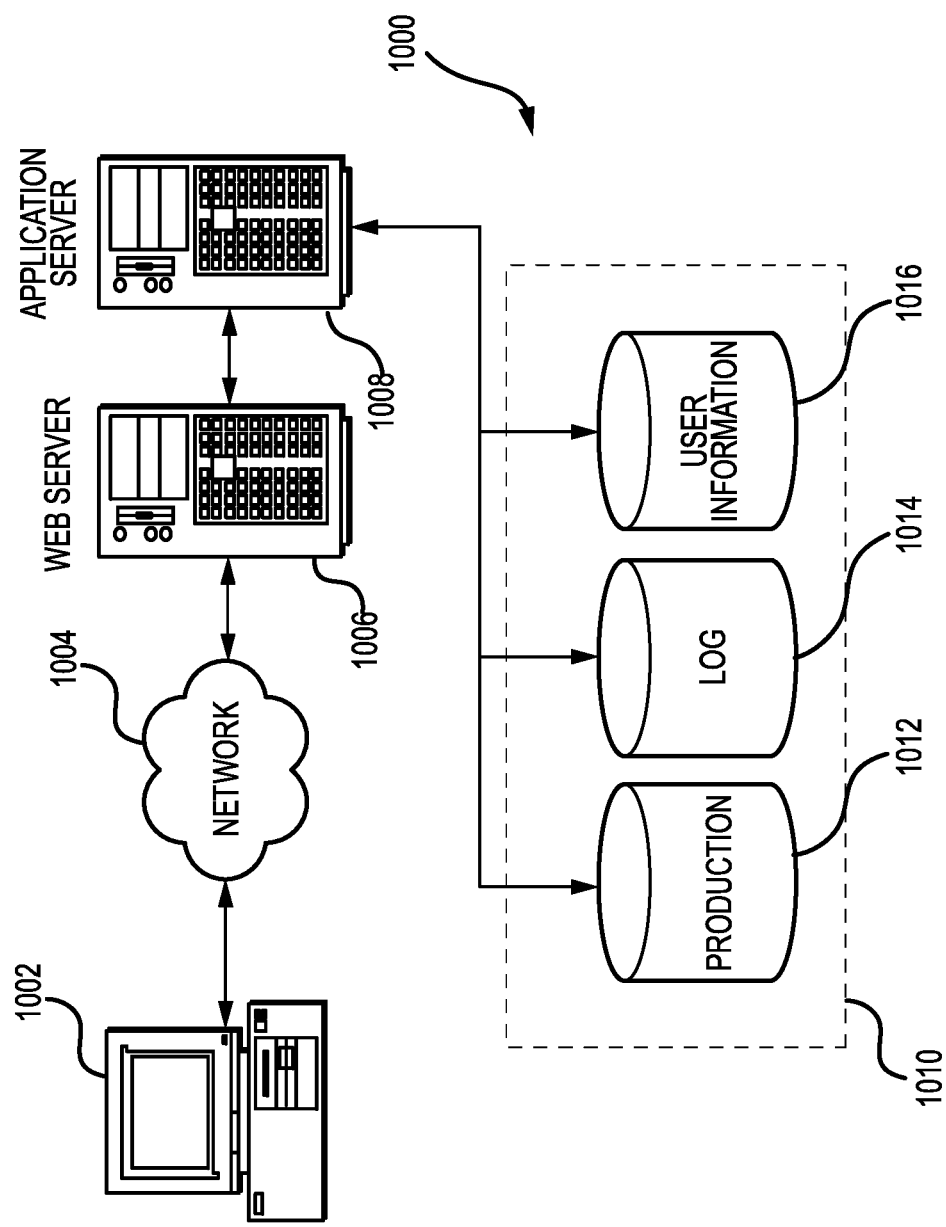

AUTOMATIC TOTE AND CARTON DIVERTER AND CHUTE SYSTEM

BACKGROUND

A packaging machine is often used to package an item for shipping. The packaging machine can package the items in a suitable enclosure, such as an envelope, bubble wrapping, or box. A user can receive items to load into the packaging machine or to manually package in a tote conveyed on a conveyor system. The user may remove the tote from the conveyor system before removing the items from the tote and packaging them with the packaging machine.

BRIEF DESCRIPTION OF THE DRAWINGS

Various embodiments in accordance with the present disclosure will be described with reference to the drawings, in which:

FIG. 10 illustrates an environment in which various embodiments can be implemented.

DETAILED DESCRIPTION

Figure 1:
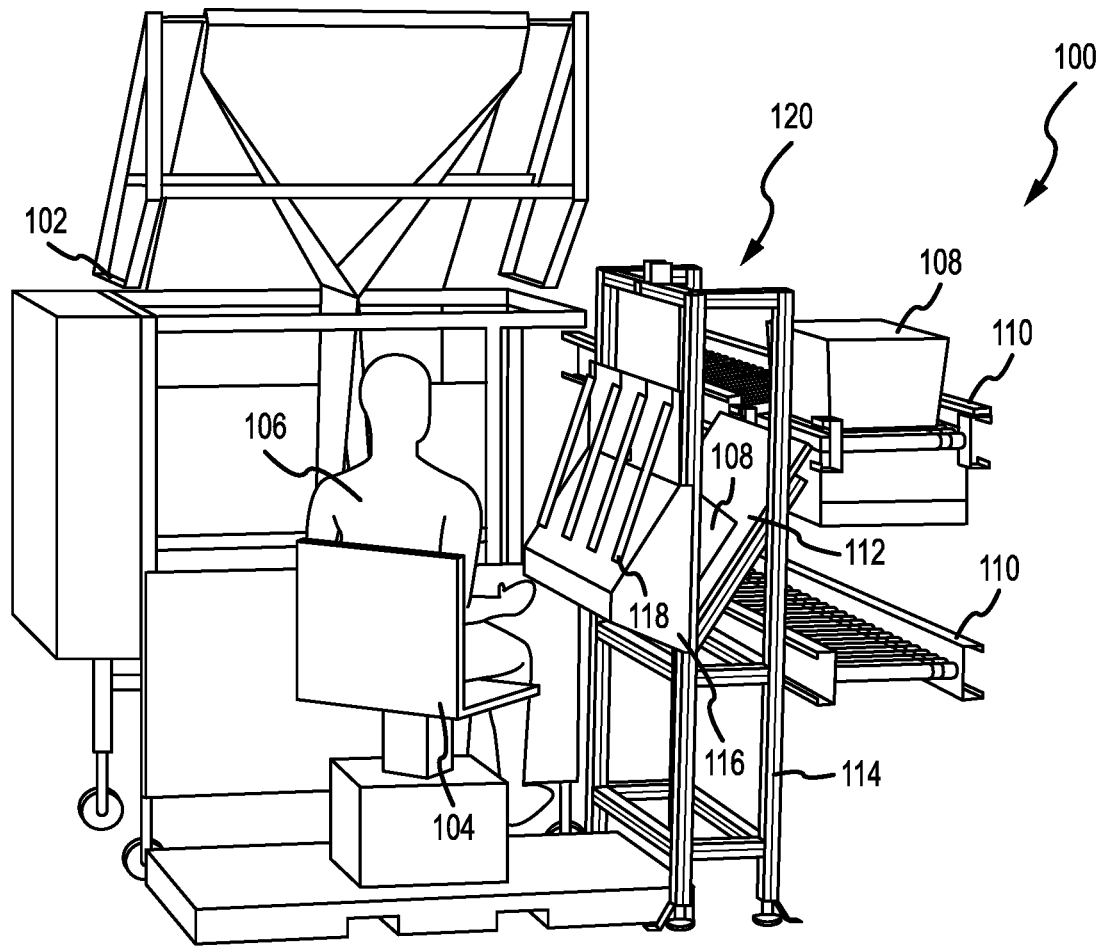
FIG. 1 illustrates an inventory handling system that includes a packaging machine, conveyor system, and tote diverter and chute, according to some examples.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments and approaches described herein are directed to inventory handling systems, particularly to inventory container diversion and unloading systems that include a conveyor system and a packaging machine. In some embodiments, the tote diversion system receives inventory containers from the conveyor system and redirects or diverts the inventory container to an unloading ramp that places the inventory container at an ergonomic height for users to unload inventory items from the inventory container. The final unloading height and angle of the opening of the inventory container are adjustable based on user characteristics such as height.

In many embodiments, the inventory container diversion system is configured to advance inventory items and inventory containers along a conveyor system and divert the totes and inventory items for packaging. For example, an inventory diverter system can include a right-angle-transfer that propels the inventory container off of a conveyor belt at a right angle into a diverter chute. The diverter chute is at a slope so the inventory container slides to a bottom of the diverter chute. The diverter chute is adjustable to provide ease-of-access to the interior of the inventory container for removing inventory items for packaging at a packaging machine. The diverter chute presents the inventory container at an angle to provide greater access to items at the bottom of the inventory container for a user. The inventory container diversion system includes a door between a user space and the diverter chute that prevents inventory containers from sliding down the diverter chute and tipping or falling out of the end. The inventory diversion system also includes sensors to detect when the diversion chute is empty and when the door is closed. When the sensors detect that the diversion chute is empty and the door is closed, a computing device generates signals to advance an inventory container along the conveyor system to the right-angle-transfer and into the diversion chute.

Because embodiments described herein allow automated diverting and adjustable height for access to inventory containers, greater numbers of inventory containers may be unloaded and inventory items packaged for shipment, saving time and expense. Additionally, the diverter system allows simple unloading of conveyor systems for users at comfortable ergonomic positions.

In the following description, various embodiments will be described. For purposes of explanation, specific configurations and details are set forth in order to provide a thorough understanding of the embodiments. however, it will also be apparent to one skilled in the art that the embodiments may be practiced without the specific details. Furthermore, well-known features may be omitted or simplified in order not to obscure the embodiment being described.

FIG. 1 illustrates an inventory handling system 100 that includes a packaging machine 102, conveyor 110, and inventory container staging apparatus 120, according to some examples. The packaging machine 102 is a bubble mailer packaging machine for enclosing inventory items in a durable, moisture resistant polyethylene film that is ready for shipment. The packaging machine 102 is capable of packaging many inventory items per minute, for example the packaging machine 102 may be configured to package up to twenty inventory items per minute or more.

The packaging machine 102 includes a single sheet or roll of packaging material which is fed over an upper portion of the packaging machine 102 and folded longitudinally to form an unsealed envelope. The packaging material may include multiple layers such as polyethylene film, bubble wrap, paper-backed plastic films, or other similar materials suitable for shipment packaging. The unsealed envelope is open at one end, where inventory items are inserted. After an inventory item is inserted into the unsealed envelope, the packaging machine 102 seals the unsealed envelope to form a shipping pouch and separates the shipping pouch from the sheet of packaging material and delivers the shipping pouch with the inventory item for further processing or shipment.

In some examples, the packaging machine 102 may apply labels to the shipping pouch to prepare for shipment or otherwise prepare inventory items to ship. Additionally, other configurations of packaging machines 102 are contemplated, including those which receive two or more sheets of packaging material to form the unsealed envelope or packaging machines 102 configured to form and seal shipment boxes.

A user 106 may insert inventory items into the packaging machine 102 as described above, or may use a feeding apparatus such as a conveyor and orienting apparatus to input inventory items into the packaging machine 102. In the example shown in FIG. 1, the user 106 is seated in a chair 104 that rotates or pivots to give the user 106 access to the inventory container staging apparatus 120 as well as the packaging machine 102.

The inventory container staging apparatus 120, described in further detail below, includes a chute 112 with an upper end or entrance adjacent the conveyor 110 and a lower end or exit positioned adjacent the user 106 or the space occupied by the user 106. The conveyor 110 includes a diverter, such as a right-angle-transfer, to direct inventory container 108 off the conveyor 110 into the chute 112. An inventory container 108 slides down the chute 112 from the conveyor 110 towards the user 106. At the bottom end of the chute 112 is an inventory stop 116 that serves as a barrier to halt the movement of the inventory container 108 on the chute 112. To close the bottom end of the chute 112, a moveable door 118 ensures that inventory container 108 doesn't tip out of the chute 112. The inventory container staging apparatus 120 is supported by a base 114 which may be adjustable to position the angle of the inventory container 108 or the height of the exit of the chute 112 relative to the user 106.

In some examples, the inventory container staging apparatus 120 may also include a tote removal device (not shown). The tote removal device may divert the inventory container 108 into the conveyor 110 or onto a second conveyor after the user 104 has accessed the inventory container 108, thereby eliminating the need for the user 106 to lift the inventory container 108. In one example, after accessing an inventory container 108, the user 106 may shut the door 124 and either upon shutting the door 124 or activation of an input device, such as a switch, a pushing arm may push the inventory container 108 back up the chute 112 onto the conveyor 110 to be directed away from the packaging machine 102 or onto a removal conveyor to be redirected back to an inventory storage or handling area.

Figure 2:
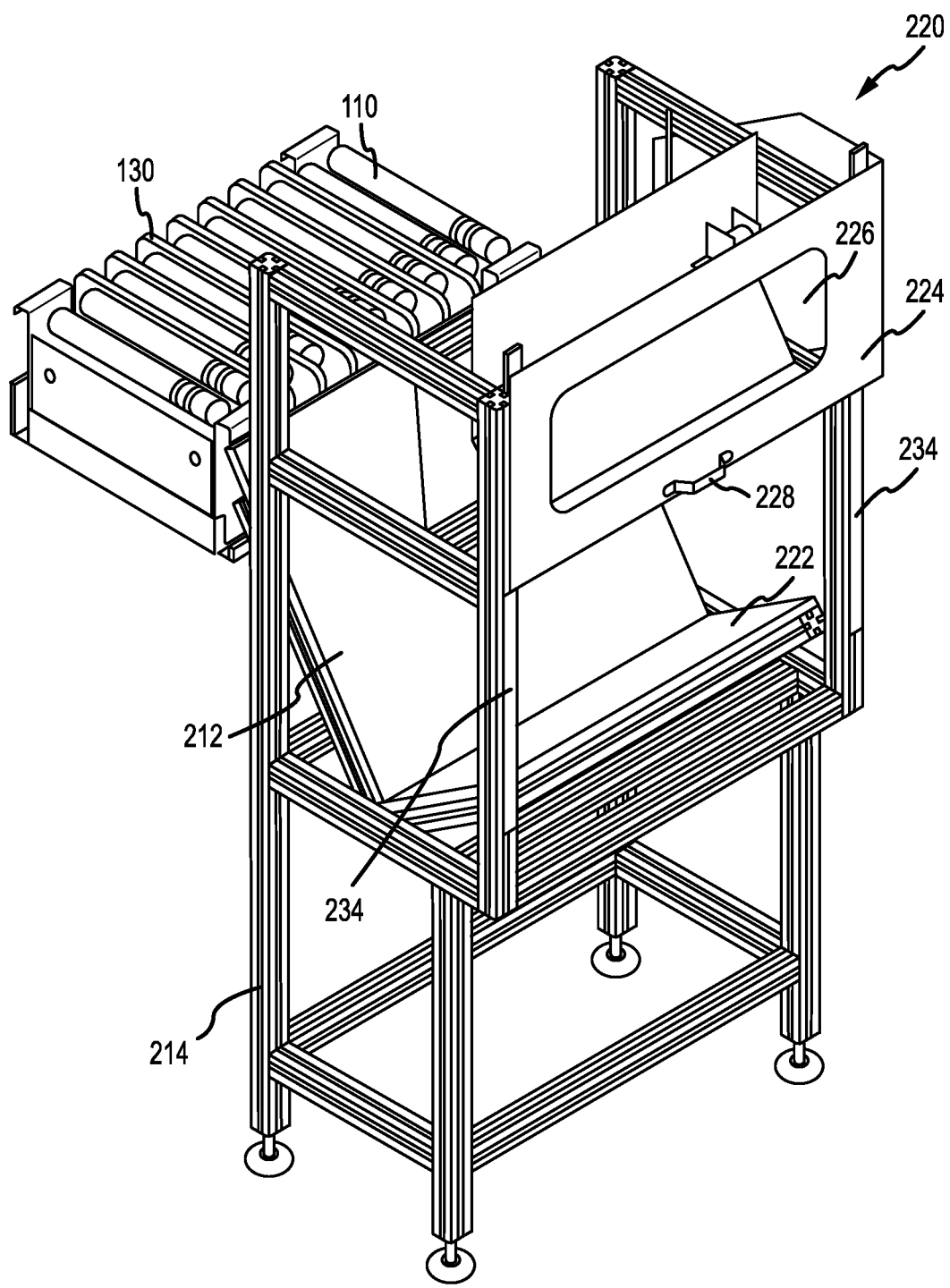
FIG. 2 illustrates a tote diverter and chute having a viewing window, according to some examples.

FIG. 2 illustrates a perspective view of an inventory container staging apparatus 220 having a window 226, according to some examples. The window 226 allows a user 106 to visibly confirm when an inventory container 108 is on the chute 212 to be unloaded.

Conveyor 110 is configured to carry inventory containers 108 through a shipment processing center, conveying inventory to be packaged and subsequently shipped. Conveyor 110 may include a number of motor driven rollers in series or may include a conveyor belt driven by rollers. Conveyor 110 includes a right-angle-transfer 130 adjacent the chute 212 that propels inventory containers perpendicularly off the conveyor 110 indo the inventory container staging apparatus 220. The right-angle-transfer 130 may include a typical right-angle transfer known to those in the art, may include an arm or pushing element to push the inventory container 108 perpendicularly off the conveyor 110.

The inventory container staging apparatus 220 is supported by a base 214 including a framework of struts, which is adjustable to maintain the end 222 of chute 212 at a height suitable for a user. The struts may be formed of a structural material, such as aluminum, or may be any suitable structural material that has sufficient rigidity to support the components of the inventory container staging apparatus 220 and the inventory container 108. The end 222 of chute 212 is perpendicular to the surface of chute 212. In at least one example, the height of the end 222 of chute 212 may be positioned to support an inventory container 108 at a height of between 20 and 40 inches from a supporting surface that the base 214 rests upon. Additionally, the end 222 of chute 212 maintains an inventory container 108 at an angle of between 30 and 50 degrees, to enable a user to easily reach to the bottom of the inventory container 108.

The chute 212 rests at an angle of between 30 and 50 degrees, for example at an angle of 45 degrees with respect to the supporting surface under the base 214. The chute 212 may be formed of a solid material such as a plastic, metal, or other such material. In some examples the chute 212 may have a texture or surface treatment to change or increase the coefficient of friction of the surface to slow the inventory container 108 as it proceeds down the chute 212 to prevent the inventory container 108 moving too rapidly and potentially tilting out of the chute 212 past the end 222. For example, the coefficient of friction of the chute 212 may be above a threshold of 0.3 to ensure the inventory container 108 does not slide down the chute 212 too rapidly.

The inventory container staging apparatus 220 includes a door 224 having a window 226 that provides the user 106 a view of the chute 212 to see when an inventory container 108 is present in the inventory container staging apparatus 220. The window 226 may have a glass or clear plastic element, or may be a simple passage through the material of the door 224. The door 224 is mounted to the base 214 with slidable connections 234, such as linear rails, slide rails, bearings and guides, or other suitable linear components that allow the door 224 to move relative to the base 214. In some examples, the door 224 may be on a hinge such that it is rotatably coupled to the base 214. The door 224 also includes a handle 228 which the user 106 may grasp to move the door 224.

Figure 3:
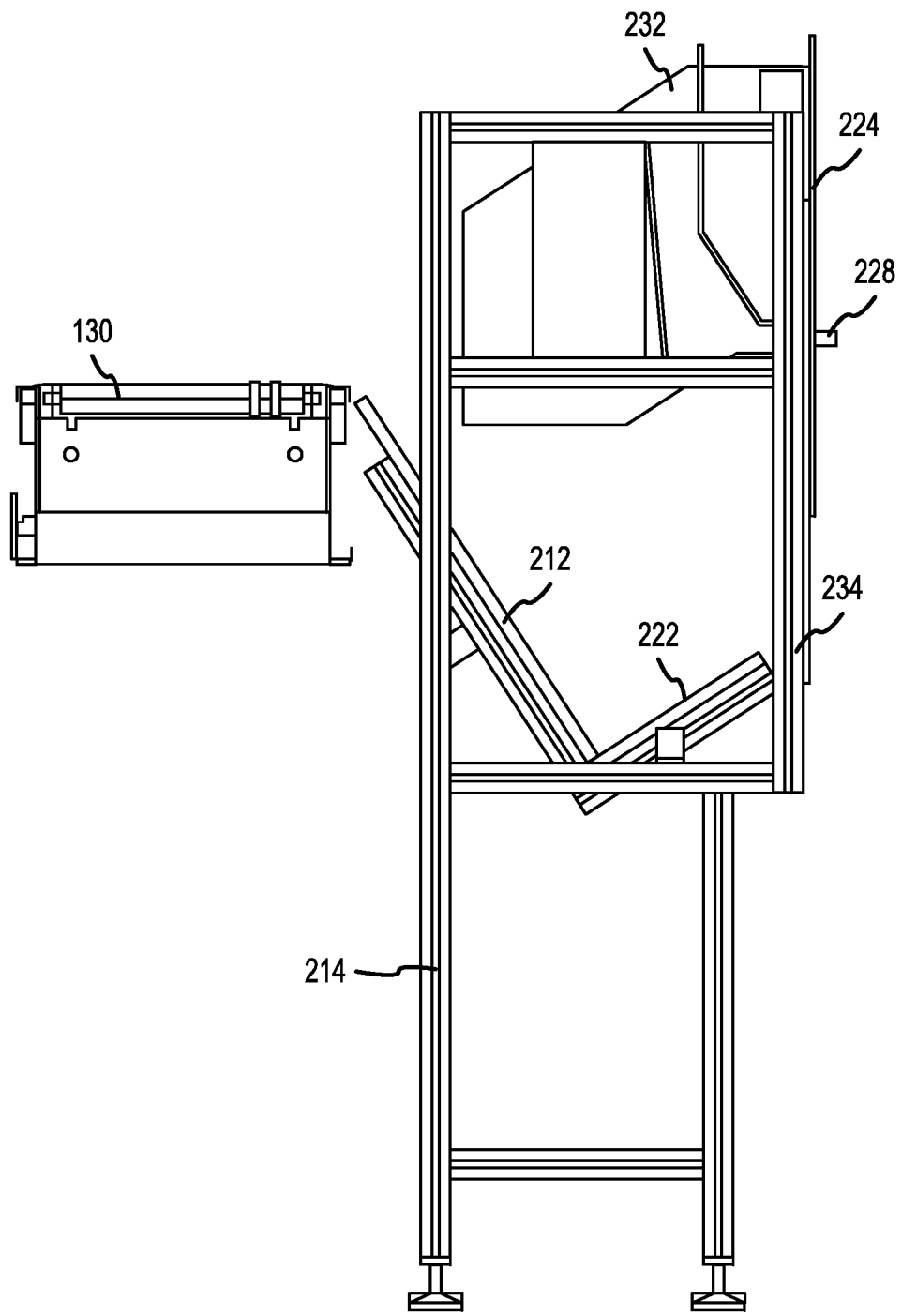
FIG. 3 is a side view of the tote diverter and chute of FIG. 2.

FIG. 3 is a side view of the inventory container staging apparatus 220 of FIG. 2. The side view of the inventory container staging apparatus 220 shows the chute 212 inclined at a relatively steep angle, which is adjustable to a shallower or less steep angle based on the desired height of the end 222. For instance, when the inventory container staging apparatus 220 is adjusted to have the end 222 at a height of around 20 inches, the chute 212 is at a steeper angle than when the end 222 is at a height of around 40 inches. Supports or connections between the chute 212 and the base 214 allow adjustment of the angle of the chute 212 either by including a pivoting connection or by including a first connection that moves vertically along the base and a second connection that moves horizontally along a strut of the base 214.

As depicted in FIG. 3, the door 224 is coupled to a closure 232 that moves with the door 224 to close in a space at the bottom end of chute 212, defined by chute 212, end 222, and closure 232. The space may be open on a side facing the conveyor 110 to allow inventory containers 108 to enter the space while the door 224 and closure 232 are shut.

Figure 4:
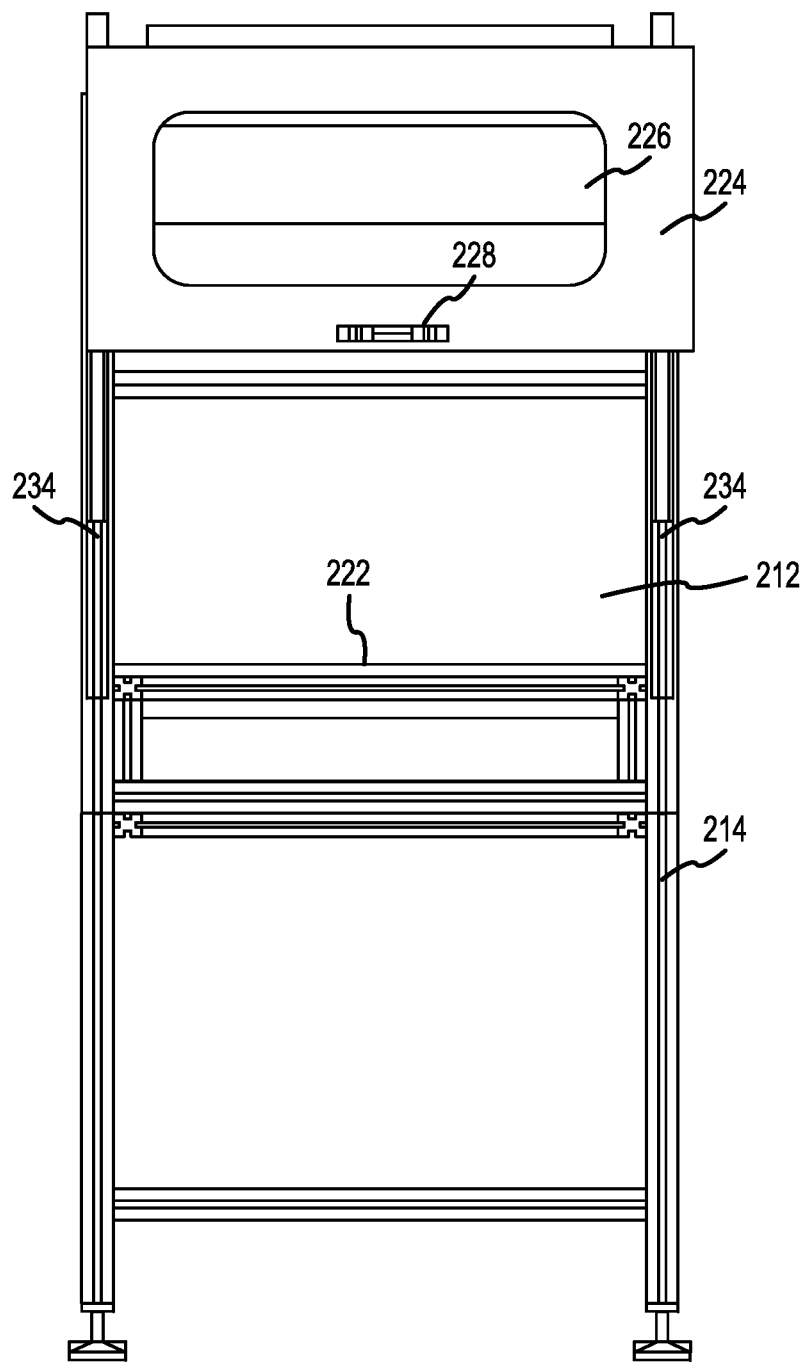
FIG. 4 is a front view of the tote diverter and chute of FIG. 2.

FIG. 4 is a front view of the inventory container staging apparatus 220 of FIG. 2. The front view of FIG. 4 shows the view of the inventory container staging apparatus 220 facing the user 106 while in use. The door 224 is shown in the upper, open, position with the components described above. The end 222 presents the inventory container 108 to the user at an angle as described above to facilitate reaching inventory items contained within the inventory container 108. This may improve the ability of a user 106 who is seated to simple reach into the inventory container 108 without requiring additional movements or reaching to either remove the inventory container 108 from the conveyor 110, or to empty the inventory container 108.

Figure 5:
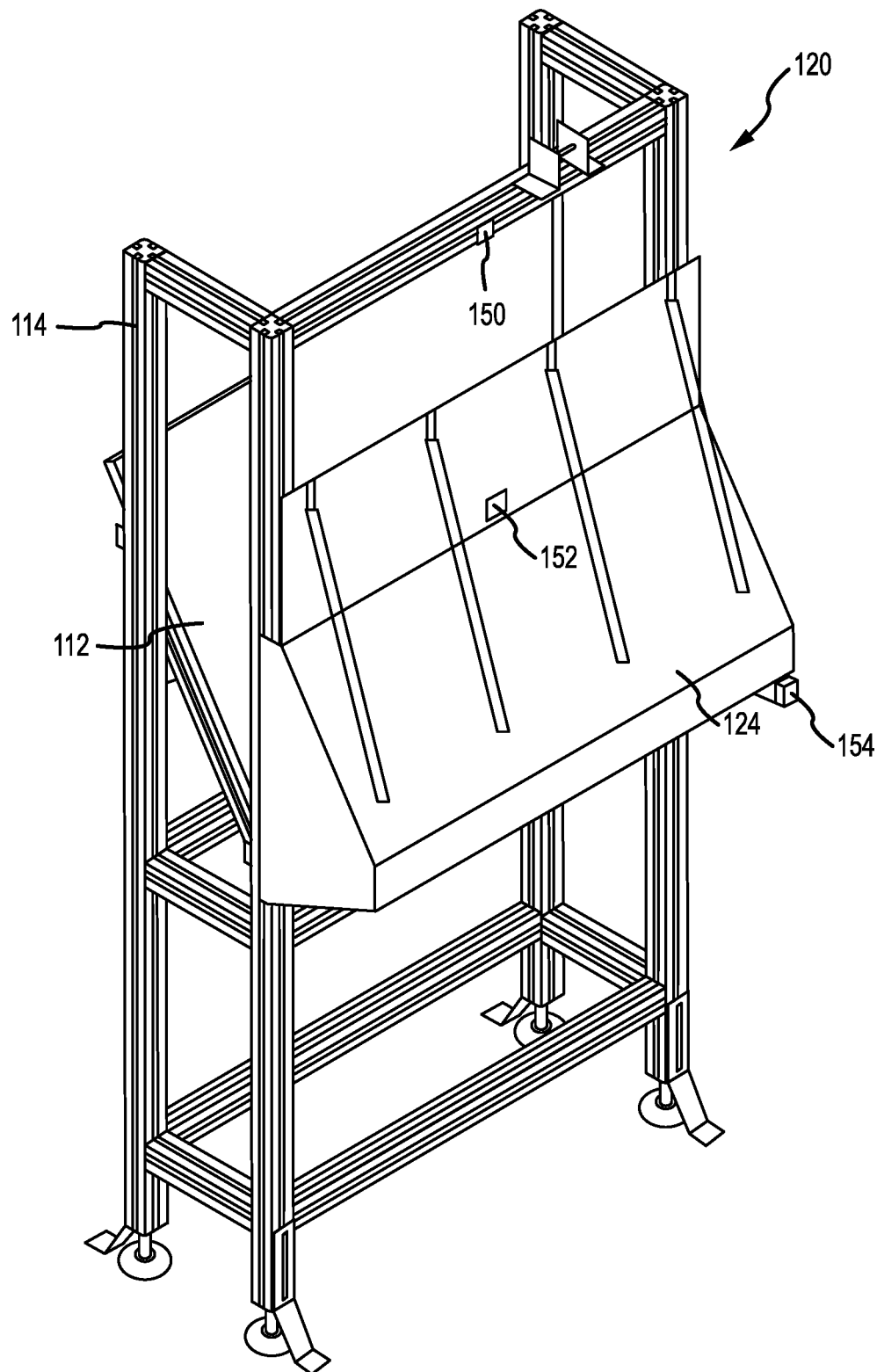
FIG. 5 is a perspective view of the tote chute of FIG. 1.

FIG. 5 is a perspective view of the inventory container staging apparatus 120 of FIG. 1 and includes sensors to detect when the door 124 of the inventory container staging apparatus 120 is open or when an inventory container 108 is within the inventory container staging apparatus. Although the inventory container staging apparatus 120 does not include a window, a window may be included for user visibility into the inventory container staging apparatus 120 when the door 124 is shut as described above with respect to FIGS. 2 through 4. The chute 112, base 114, and door 124 are substantially the same as the chute 212, base 214, and door 224 described above with respect to FIGS. 2 through 4.

The door 124 includes a sensor component 152 that is usable by a computing device to detect when the door 124 is open or closed. A second sensor component 150 is positioned on the base 114 to detect when the sensor component 152 is nearby, thereby indicating to the computing device that the door 124 is open. The sensor component 152 and the second sensor component 150 may be two parts of a magnetic sensor. In some examples, the door 124 may include other types of sensors such as proximity sensors or contact sensors at the top or at the bottom of the door 124 to detect when the door 124 is in an open or a closed configuration. The sensor component 152 or the second sensor component 150 is in communication with a computing device, such as described below, and may be used in carrying out processes described with respect to FIG. 9 below.

A tote sensor 154 is included at the bottom end of chute 112 to detect when an inventory container is on the chute 112. The tote sensor 154 may be a contact sensor, a proximity sensor, a break beam sensor, an optical sensor, or any other suitable sensor capable of detecting the presence of an object on the chute 112. For example, with a break beam sensor as the tote sensor 154, the inventory container 108 may interrupt a beam of light sent from an emitter to a receiver on opposite sides of the chute 112, thereby preventing the receiver from receiving the beam of light and indicating the presence of an inventory container 108 in the chute 112. The tote sensor 154 is in communication with the computing device in the same manner as the sensor component 152 described above.

Figure 6:
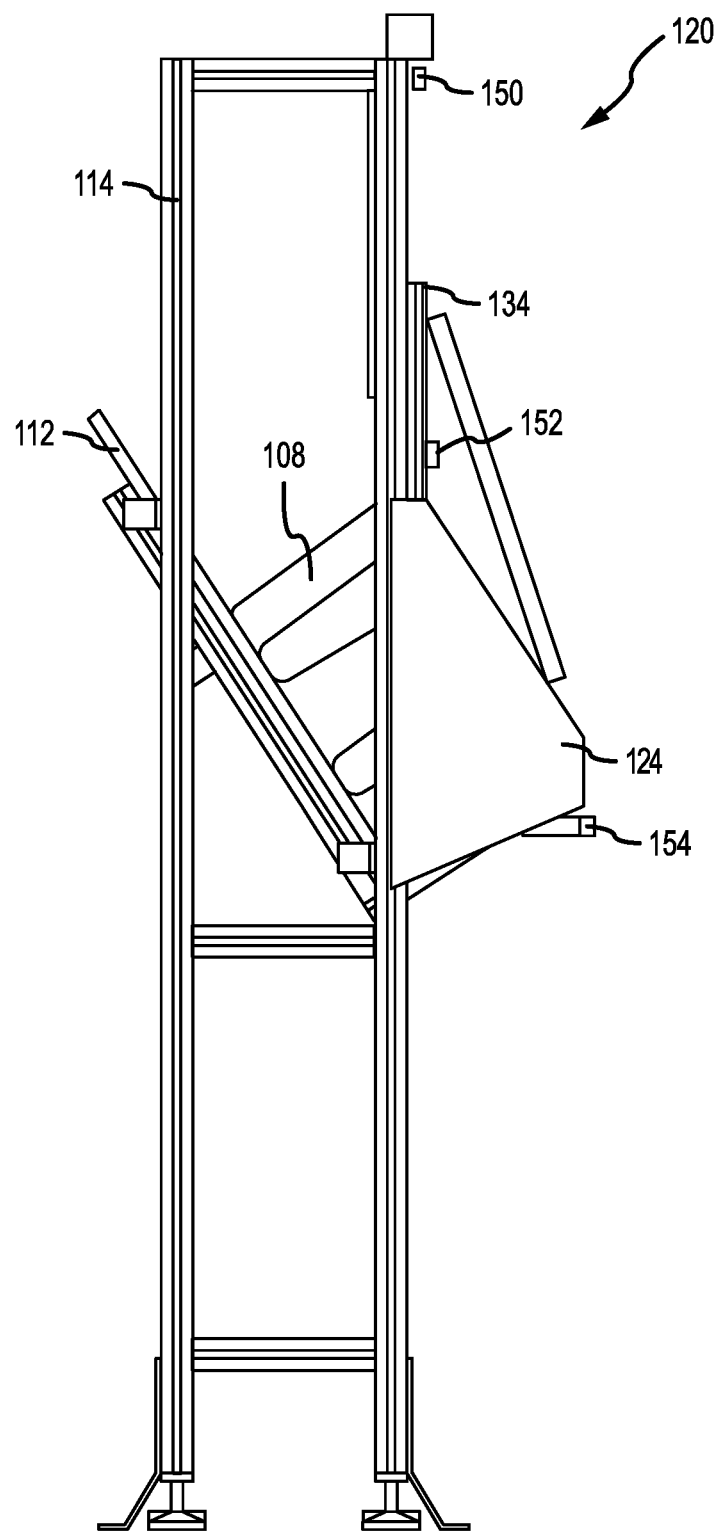
FIG. 6 is a side view of the tote chute of FIG. 1.

FIG. 6 is a side view of the tote chute of FIG. 1. The inventory container 108 pictured in FIG. 6 is detected by the tote sensor 154, which may be a contact sensor that is activated when an inventory container 108 contacts the tote sensor 154 at the bottom of the chute 112. Additionally, the sensor component 152 and the second sensor component are separated so the sensor component 152 will generate a signal indicating the door 124 is closed.

The upper end of chute 112 may be adjustable by moving the connection point of the chute 112 to the base 114 vertically along the base 114. Moving the connection point vertically up or down the base 114 adjusts the angle of the chute 112. The connection of the bottom of the chute 112 to the base 114 may likewise be adjusted vertically to change the angle of the chute 112 and also the height of the end of the chute 112 for different heights according to the needs and sizes of various users.

As the chute 112 is adjusted, the tote sensor 154 remains at the bottom of the chute 112 and does not need to be adjusted independently, as it functions with the chute 112 at any height or angle. Additionally, the sensor component 152 does not require any adjustment. In some examples, there may be a door sensor positioned between the door 124 and the chute 112 to generate a signal only when the door 124 is in contact with or in close proximity to the chute 112. For example, a contact switch may engage when the door 124 contacts the chute 112 at the bottom of the moveable region covered by the door 124. The contact switch then communicates a signal to a computing device indicating the door 124 is shut, the signal to be used as described with respect to FIG. 9 below.

Figure 7:
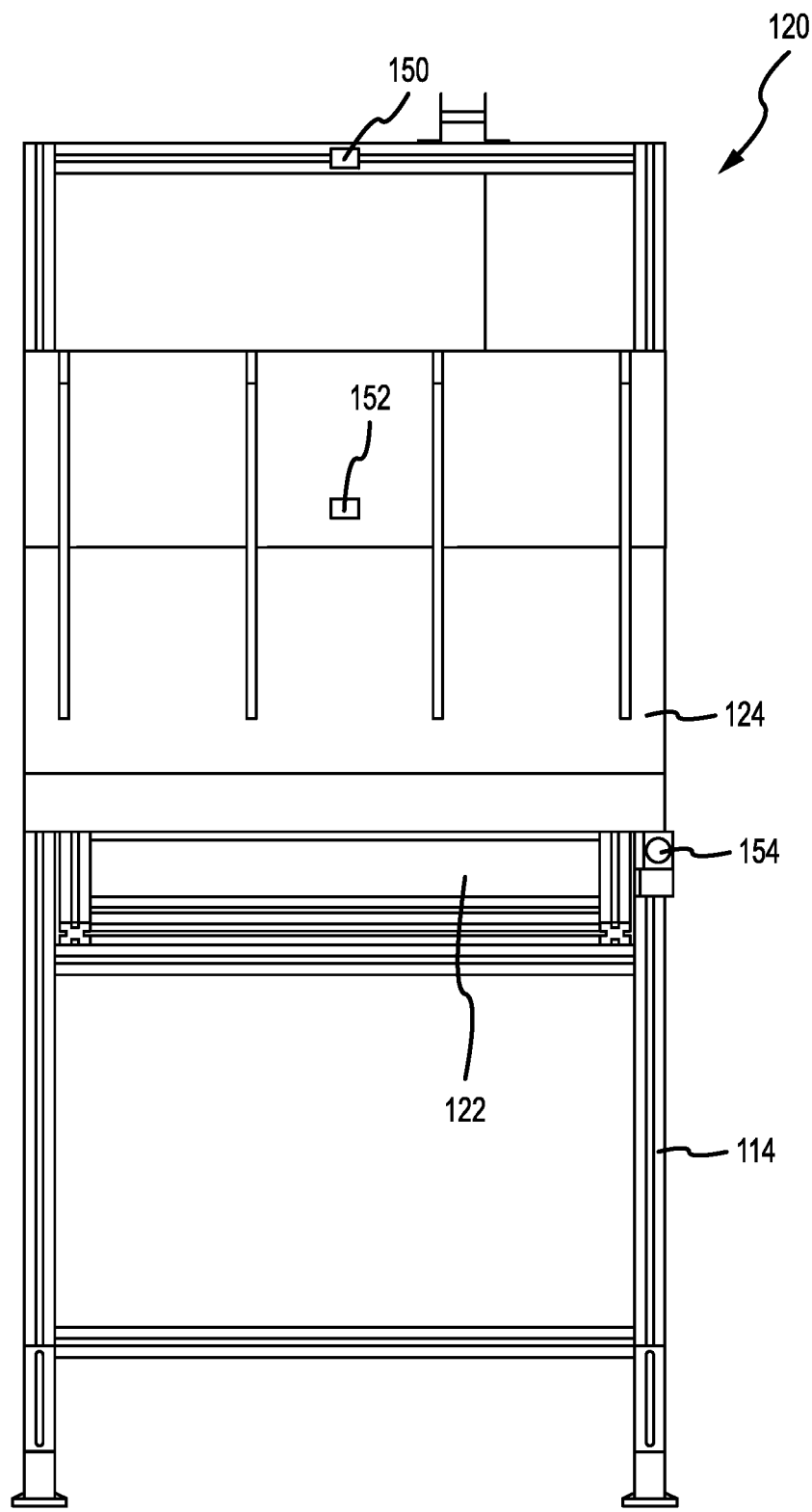
FIG. 7 is a front view of the tote chute of FIG. 1.

FIG. 7 is a front view of the tote chute of FIG. 1 and includes the same components described above with respect to FIGS. 4 through 6 including the base 114, door 124, tote sensor 154, sensor component 152, chute 112, and end 122. From this side of the inventory container staging apparatus 120, the user 106 may open or close the door 124 to gain access to an inventory container 108 and remove items from the inventory container 108 for packaging at the packaging machine 102.

Figure 8:
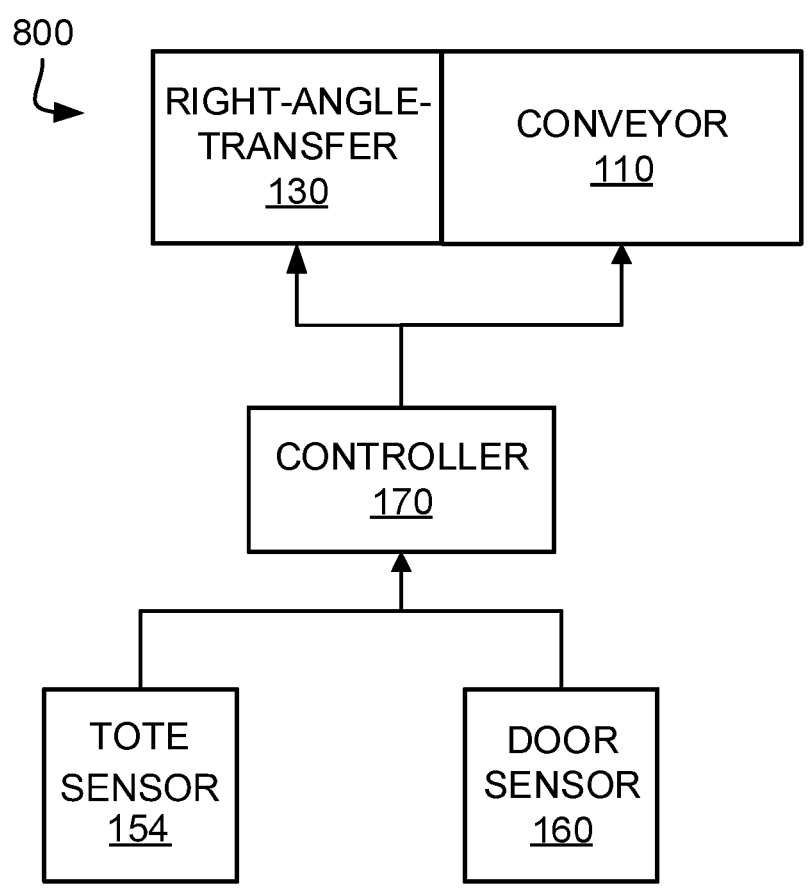
FIG. 8 is a block diagram depicting a schematic for controlling a tote diverter and chute, according to some examples.

FIG. 8 depicts a block diagram depicting a schematic 800 for controlling an inventory container staging apparatus 120. The controller 170 shown in FIG. 8 may be a computing device, or devices, such as described below with respect to FIG. 10 that is configured to control elements of the tote diverter and chute 120 as well as a larger inventory handling system 100. The controller 170 conveys and receives signals from various elements of the inventory handling system 100 and the inventory container staging apparatus 120 such as the conveyor 110, the right-angle-transfer 130, the tote sensor 154, and a door sensor 160. The door sensor 160 may be the same as the sensor component 152 and the second sensor component 150 or may encompass an equivalent sensor that detects when the door 124 of the inventory container staging apparatus 120 is open or closed.

The controller 170 is configured to receive a signal from the tote sensor 154 indicating the presence, or absence of, an inventory container 108 in the chute 112 as described above. The signal may be relayed via a network or wired communication as described below with respect to FIG. 10.

The controller 170 is configured to receive a signal from the door sensor 160 indicating the status of the door 124, whether it is open or closed, as described above. The signal may be transferred to the controller in a similar manner to the signal from the tote sensor 154.

After receiving signals from the tote sensor 154 and the door sensor 160, the controller 170 may generate signals to convey to the right-angle-transfer 130 and the conveyor 110. The signals generated by the controller 170 may be generated based on the process 900 described below and may instruct the conveyor 110 to advance an inventory container 108 and may also instruct the right-angle-transfer 130 to divert an inventory container 108 into the chute 112.

Other elements of the inventory handling system 100 may be controlled by controller 170, such as a conveyor sensor (not shown) that detects a position of an inventory container 108 on the conveyor 110. For example, the conveyor sensor may include a beam break sensor that detects when an inventory container is adjacent to the right-angle-transfer 130 on conveyor 110. The controller 170 may carry out process 900 or other processes involving the inventory handling system 100 or inventory container staging apparatus 120.

Figure 9:
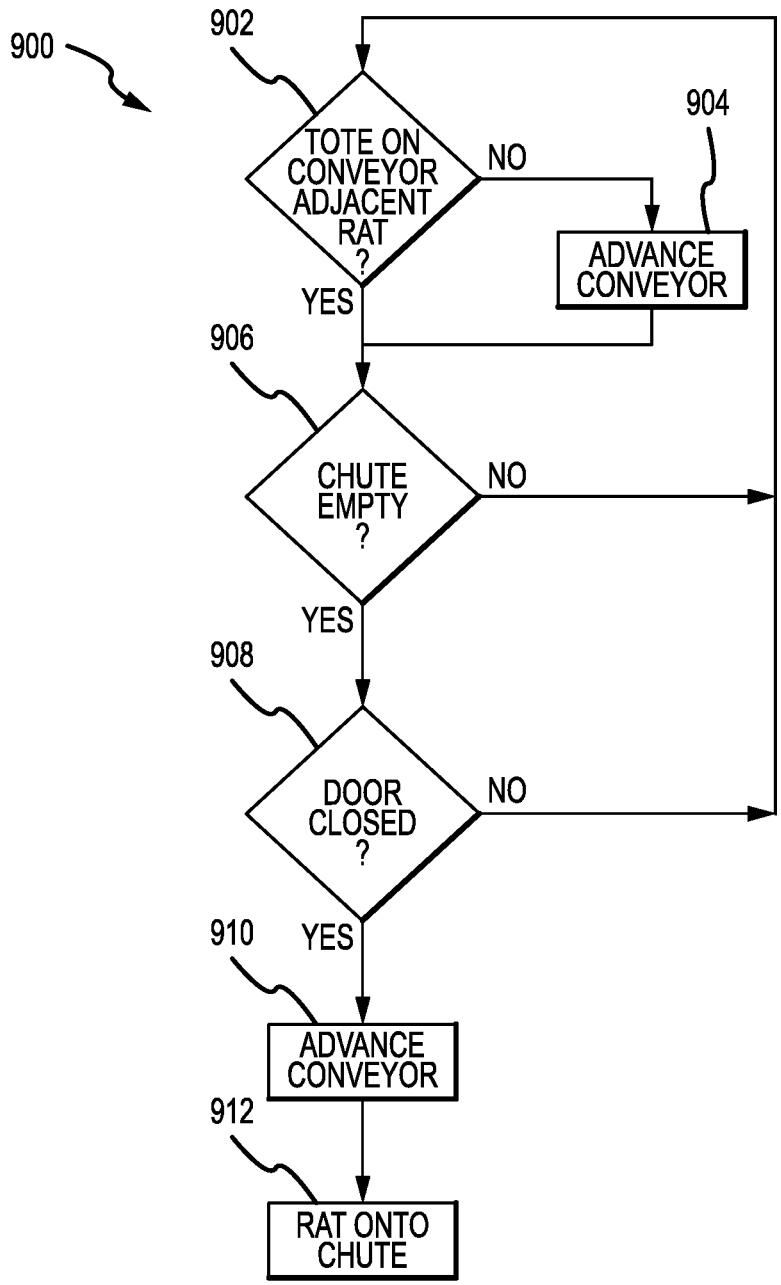
FIG. 9 illustrates a block diagram depicting a process for diverting a tote using a tote diverter and chute, according to some examples.

FIG. 9 illustrates a block diagram depicting a process 900 for diverting a tote using a tote diverter and chute, according to some examples. Some or all of the process 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 900 begins at block 902 with an inventory container 108 on the conveyor 110 adjacent to or near the right-angle-transfer 130. In some examples, the conveyor 110 may include a break beam sensor or other sensor, such as an optical sensor, to detect when an inventory container 108 is positioned near or adjacent the right-angle-transfer 130. If the inventory container 108 is not detected adjacent the right-angle-transfer 130, the conveyor 110 advances an inventory container 108, at block 904 up to a position adjacent the right-angle-transfer 130.

When an inventory container 108 is adjacent the right-angle-transfer 130, either from block 902 or after advancing the conveyor 110 in block 904, the computing device determines, at block 906, whether the chute 112 is empty or occupied by an inventory container 108. This determination is made based on the tote sensor 154 and a signal generated by the tote sensor 154. For example, the tote sensor 154 may generate a signal when in contact with an inventory container 108, and the computing device will make a determination that the chute 112 is not empty based on the signal from the tote sensor 154. The process 900 may then return to block 902 and continue advancing inventory containers 108 along the conveyor 110, for instance to other inventory container staging apparatus 120 or other destinations and only proceed to block 908 when the computing device determines, based on the signal from the tote sensor 154, or lack of signal from the tote sensor 154, that the chute 112 is empty.

At block 908, the computing device determines whether the door 124 is closed. This may involve making a determination about the position of the door based on a door sensor such as the sensor component 152 and the second sensor component 150. For example, the door 124 may rest in an open position such that the sensor component 152 and second sensor component 150 are substantially aligned or in close proximity, generating a signal to the computing device that the door 124 is in the open position. In the case of a contact sensor or other sensor that detects when the door 124 is closed, the signal may be generated and sent to the computing device when the door 124 is resting in the closed position. As with block 906, if the computing device determines that the door 124 is open or not closed, the process 900 may return to block 902 and proceed iteratively until both the chute 112 is empty and the door 124 is closed, at which point the process 900 proceeds to block 910.

At block 910, the conveyor 110 advances the inventory container 108 onto the right-angle-transfer 130. This step may also include positioning the inventory container to be diverted by a pushing force or other such device into the inventory container staging apparatus 120 adjacent to the conveyor 110.

At block 912, the right-angle-transfer 130 activates and translates the inventory container 108 perpendicularly to the direction of the conveyor 110 into the inventory container staging apparatus 120. The inventory container 108 then slides down the chute 112 to rest at the bottom of the chute 112 against the end 122. The user 106 may then open the door 124 to access the inventory container 108 and the inventory items within for packaging at the packaging machine 102.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes a client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the example environment 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media, computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory handling system, comprising:
    a packaging machine configured to package inventory items;
    a conveyor configured to convey inventory containers;
    a right-angle-transfer configured to receive one of the inventory containers from the conveyor and selectively discharge the received inventory container from the right-angle-transfer;
    a right-angle-transfer container sensor generating a right-angle-transfer container presence output indicative of whether one of the inventory containers is disposed on or adjacent to the right-angle-transfer;
    an inventory container staging apparatus configured to receive one of the inventory containers from the right-angle-transfer, the inventory container staging apparatus comprising:
        a sloped chute sloping downwardly from the right-angle-transfer and configured to receive one of the inventory containers from the right-angle-transfer;
        an inventory container stop positioned at a bottom end of the sloped chute to limit movement of the inventory container along the sloped chute;
        an inventory container staging apparatus container sensor generating an inventory container staging apparatus container presence output indicative of whether an inventory container of the inventory containers is disposed on the sloped chute at the inventory container stop;
        a door reconfigurable between a closed configuration and an open configuration, wherein the door in the closed configuration is configured to protect a person from collision with the inventory container based on movement of the inventory container down the sloped chute, and wherein the door in the open configuration accommodates access by the person to an item within the inventory container and removal by the person of the inventory container from the inventory container staging apparatus; and
        a door sensor to detect when the door is in the closed configuration.

2. The inventory handling system of claim 1, wherein an angle of the sloped chute is adjustable to change a height of a bottom end of the sloped chute.

3. The inventory handling system of claim 1, wherein the bottom end of the sloped chute orients the inventory container at an angle of between 40 and 65 degrees from horizontal.

4. The inventory handling system of claim 1, further comprising a controller operatively coupled with the right-angle-transfer and the door sensor, wherein the controller is configured to:

control operation of the right-angle-transfer to prevent transfer of one of the inventory containers from the right-angle-transfer to the inventory container staging apparatus while the door is in the open configuration or when the inventory container staging apparatus container presence output indicates that one of the inventory containers is disposed on the sloped chute at the inventory stop; and control operation of the right-angle-transfer to transfer one of the inventory containers from the right-angle-transfer to the inventory container staging apparatus while the door is in the closed configuration and when the inventory container staging apparatus container presence output indicates that none of the inventory containers is disposed on the sloped chute at the inventory stop.

5. An inventory container handling apparatus, comprising:
- a transfer apparatus configured to receive an inventory container from a conveyor and selectively discharge the inventory container;
- a staging apparatus configured to receive the inventory container from the transfer apparatus, the staging apparatus comprising:
  - an inlet configured to receive the inventory container from the transfer apparatus, wherein the inlet has an inlet height;
  - an outlet through which the inventory container is accessed, the outlet positioned at an outlet height lower than the inlet height;
  - a door reconfigurable between a closed configuration that blocks access to an inventory container via the outlet and an open configuration that accommodates access to an inventory container via the outlet;
  - a container sensor generating output indicative of whether an inventory container is disposed at the outlet; and
  - a door sensor generating output indicative of whether the door is in the closed configuration.

6. The inventory container handling apparatus of claim 5, wherein the transfer apparatus comprises a right-angle-transfer.

7. The inventory container handling apparatus of claim 5, wherein the outlet comprises a sloped chute and the outlet is vertically adjustable to adjust an outlet height and position the inventory container for access by a user.

8. The inventory container handling apparatus of claim 5, wherein the outlet positions the inventory container at an angle in a range of 30 to 50 degrees from horizontal.

9. The inventory container handling apparatus of claim 5, further comprising a sloped chute providing a conduit between the inlet and the outlet, the chute inclined at an angle of between 40 and 65 degrees from horizontal.

10. The inventory container handling apparatus of claim 9, wherein the sloped chute has a coefficient of friction, when interfacing with the inventory container, of greater than 0.3.

11. The inventory container handling apparatus of claim 5, further comprising a controller operatively coupled with the transfer apparatus, the door sensor, and the container sensor, wherein the controller is configured to:

control operation of the transfer apparatus to prevent transfer of the inventory container from the transfer apparatus to the staging apparatus while the door is in the open configuration or when a container sensor output indicates that a second inventory container is disposed within the staging apparatus; and control operation of the transfer apparatus to transfer the inventory container from the transfer apparatus to the staging apparatus while door is in the closed configuration and when the container sensor output indicates that no second inventory container is disposed within the staging apparatus.

12. The inventory container handling apparatus of claim 5, wherein the container sensor is a photoelectric sensor, an electromechanical sensor, or a proximity sensor.

13. The inventory container handling apparatus of claim 5, wherein the door sensor is a proximity sensor or a contact sensor.

14. A method of diverting an inventory container for packaging, the method comprising:
- conveying an inventory container along a conveyor to a position adjacent a staging apparatus configured to receive the inventory container from a transfer apparatus;
- determining when the staging apparatus is clear of a previous inventory container;
- determining when a door of the staging apparatus is in a closed configuration; and
- advancing the inventory container into the staging apparatus via the transfer apparatus when:
  - the staging apparatus is empty; and
  - the door of the staging apparatus is in the closed configuration.

15. The method of claim 14, wherein determining when the staging apparatus is clear of a previous inventory container comprises receiving a signal from an inventory container sensor, the signal indicating the previous inventory container is no longer in the staging apparatus.

16. The method of claim 14, wherein determining when the door of the staging apparatus is in the closed configuration comprises receiving a signal from a door sensor indicating the door is in the closed configuration.

17. The method of claim 14, further comprising adjusting an angle of a sloped chute of the staging apparatus to position the door of the staging apparatus at a height of between 20 and 40 inches.

18. The method of claim 14, wherein conveying the inventory container to the position adjacent the staging apparatus comprises conveying the inventory container adjacent a diverting region.

19. The method of claim 18, wherein advancing the inventory container into the staging apparatus comprises:
- advancing the inventory container onto the diverting region; and
- diverting the inventory container into the staging apparatus using the diverting region.

20. The method of claim 18, wherein the diverting region comprises a right-angle-transfer.

* * * * *